US012393279B2

(12) United States Patent
Harada et al.

(10) Patent No.: US 12,393,279 B2
(45) Date of Patent: Aug. 19, 2025

(54) INFORMATION PROCESSING DEVICE AND INFORMATION PROCESSING METHOD

(71) Applicant: CANON KABUSHIKI KAISHA, Tokyo (JP)

(72) Inventors: Sayaka Harada, Saitama (JP); Nao Fujita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 18/464,340

(22) Filed: Sep. 11, 2023

(65) Prior Publication Data

US 2024/0118751 A1 Apr. 11, 2024

(30) Foreign Application Priority Data

Oct. 6, 2022 (JP) .................................. 2022-161612

(51) Int. Cl.
*G06F 3/01* (2006.01)
*G02B 27/01* (2006.01)
*G06V 40/20* (2022.01)

(52) U.S. Cl.
CPC .......... *G06F 3/017* (2013.01); *G02B 27/0172* (2013.01); *G06V 40/28* (2022.01)

(58) Field of Classification Search
CPC ...... G06F 3/017; G06V 40/28; G02B 27/0172
See application file for complete search history.

(56) References Cited

U.S. PATENT DOCUMENTS

| 8,972,902 | B2* | 3/2015 | Nishihara ............. G06F 3/0425 345/157 |
| 9,606,584 | B1* | 3/2017 | Fram ..................... G06F 1/1694 |
| 9,804,777 | B1* | 10/2017 | Ouyang ............. G06F 3/04842 |
| 10,642,369 | B2* | 5/2020 | Iyer ........................ G06V 40/11 |
| 11,693,482 | B2* | 7/2023 | Hosseinkhani Loorak ................. G06F 3/017 715/863 |
| 12,045,392 | B1* | 7/2024 | Salter ...................... G06F 3/011 |
| 2014/0208275 | A1* | 7/2014 | Mongia ................. G06F 3/0304 715/863 |
| 2015/0199020 | A1 | 7/2015 | Hatada |
| 2015/0309601 | A1* | 10/2015 | Izumi .................. G06F 3/04883 345/173 |
| 2016/0291698 | A1* | 10/2016 | Niinuma ................. G06F 3/017 |
| 2017/0031530 | A1 | 2/2017 | Ikeda |

(Continued)

FOREIGN PATENT DOCUMENTS

| JP | 2012-013514 A | 1/2012 |
| JP | 2014-060661 A | 1/2014 |

(Continued)

*Primary Examiner* — Tadesse Hailu
(74) *Attorney, Agent, or Firm* — Carter, DeLuca & Farrell LLP

(57) ABSTRACT

An information processing device that generates data to be displayed on a head-mounted display. The information processing device includes: a detection unit that detects a gesture by a first hand of a user; and a processing unit that switches, in a case where a specific gesture by the first hand is detected by the detection unit in a first operation mode in which first processing is executed in response to a first operation by a second hand of the user, to a second operation mode in which second processing different from the first processing is executed in response to the first operation by the second hand.

9 Claims, 16 Drawing Sheets

(56) References Cited

U.S. PATENT DOCUMENTS

| | | | | |
|---|---|---|---|---|
| 2017/0228130 | A1* | 8/2017 | Palmaro | G06F 3/0482 |
| 2018/0292906 | A1* | 10/2018 | Kato | H04N 5/74 |
| 2022/0080581 | A1* | 3/2022 | Wang | B25J 19/023 |
| 2022/0084279 | A1* | 3/2022 | Lindmeier | G06F 3/012 |
| 2022/0317776 | A1* | 10/2022 | Sundstrom | G06F 3/017 |
| 2023/0384907 | A1* | 11/2023 | Boesel | G06F 3/012 |
| 2024/0019938 | A1* | 1/2024 | Whitmire | G06F 3/016 |
| 2024/0028129 | A1* | 1/2024 | Whitmire | G06F 1/163 |
| 2024/0220009 | A1* | 7/2024 | Dryer | G06F 1/1626 |
| 2024/0272782 | A1* | 8/2024 | Pastrana Vicente | G06F 3/04883 |

FOREIGN PATENT DOCUMENTS

| | | |
|---|---|---|
| JP | 2014006661 A | 1/2014 |
| JP | 2018151851 A | 9/2018 |
| JP | 2018-158151 A | 10/2018 |

* cited by examiner

INFORMATION PROCESSING DEVICE AND INFORMATION PROCESSING METHOD

BACKGROUND OF THE INVENTION

Field of the Invention

The present invention relates to an information processing device and an information processing method.

Description of the Related Art

There have been mixed reality (MR) technologies to merge a real space and a virtual space together so that a person is enabled to sense a virtual object. In the MR technologies, a system combines a computer graphic (CG) expressing a virtual object with a real landscape to be presented, and expresses the contact between a real object and a virtual object.

In the MR technologies, it is possible to move a virtual object overlapping a real landscape in accordance with a gesture by a user's hand. A user is enabled to perform the movement or the like of a CG object by a gesture without using a controller.

Further, the user is also enabled to perform the input of characters or the drawing of lines, characters, graphics on a designated drawing area such as a whiteboard.

Japanese Patent Application Laid-open No. 2018-151851 discloses a method for displaying an operation GUI and performing a function in accordance with a detected gesture. In Japanese Patent Application Laid-open No. 2018-151851, the operation GUI is displayed at a display position corresponding to the position of a detected gesture. The operation GUI is associated with gestures and functions. A function corresponding to the operation GUI is performed in accordance with a detected gesture.

However, it is assumed in Japanese Patent Application Laid-open No. 2018-151851 that both gestures and operations through the GUI are performed by one hand. Therefore, when the gestures and the operations through the GUI are performed by one hand, operability is poor (inconvenience, reduced efficiency, botheration, or the like is caused).

SUMMARY OF THE INVENTION

Therefore, an object of the invention is providing high operability for a user in a case where gestures are used in operations.

An aspect of the invention is an information processing device that generates data used for a display on a head-mounted display, the information processing device including at least one memory and at least one processor that function as: a detection unit configured to detect a gesture by a first hand of a user; and a processing unit configured to switch, in a case where a specific gesture by the first hand is detected by the detection unit in a first operation mode in which first processing is executed in response to a first operation by a second hand of the user, to a second operation mode in which second processing different from the first processing is executed in response to the first operation by the second hand.

An aspect of the invention is an information processing method for generating data used for a display on a head-mounted display, the information processing method including: detecting a gesture by a first hand of a user; and switching, in a case where a specific gesture by the first hand is detected in detecting in a first operation mode in which first processing is executed in response to a first operation by a second hand of the user, to a second operation mode in which second processing different from the first processing is executed in response to the first operation by the second hand.

Further features of the present invention will become apparent from the following description of exemplary embodiments with reference to the attached drawings.

DESCRIPTION OF THE EMBODIMENTS

Hereinafter, embodiments of the present invention will be described in detail on the basis of the accompanying drawings. Note that each of the following embodiments is an example of the implementation unit of the present invention, and may be appropriately corrected or changed depending on the configurations or various conditions of a device to which the present invention is applied. Further, it is also possible to appropriately combine the respective embodiment together.

First Embodiment

Figure 1:
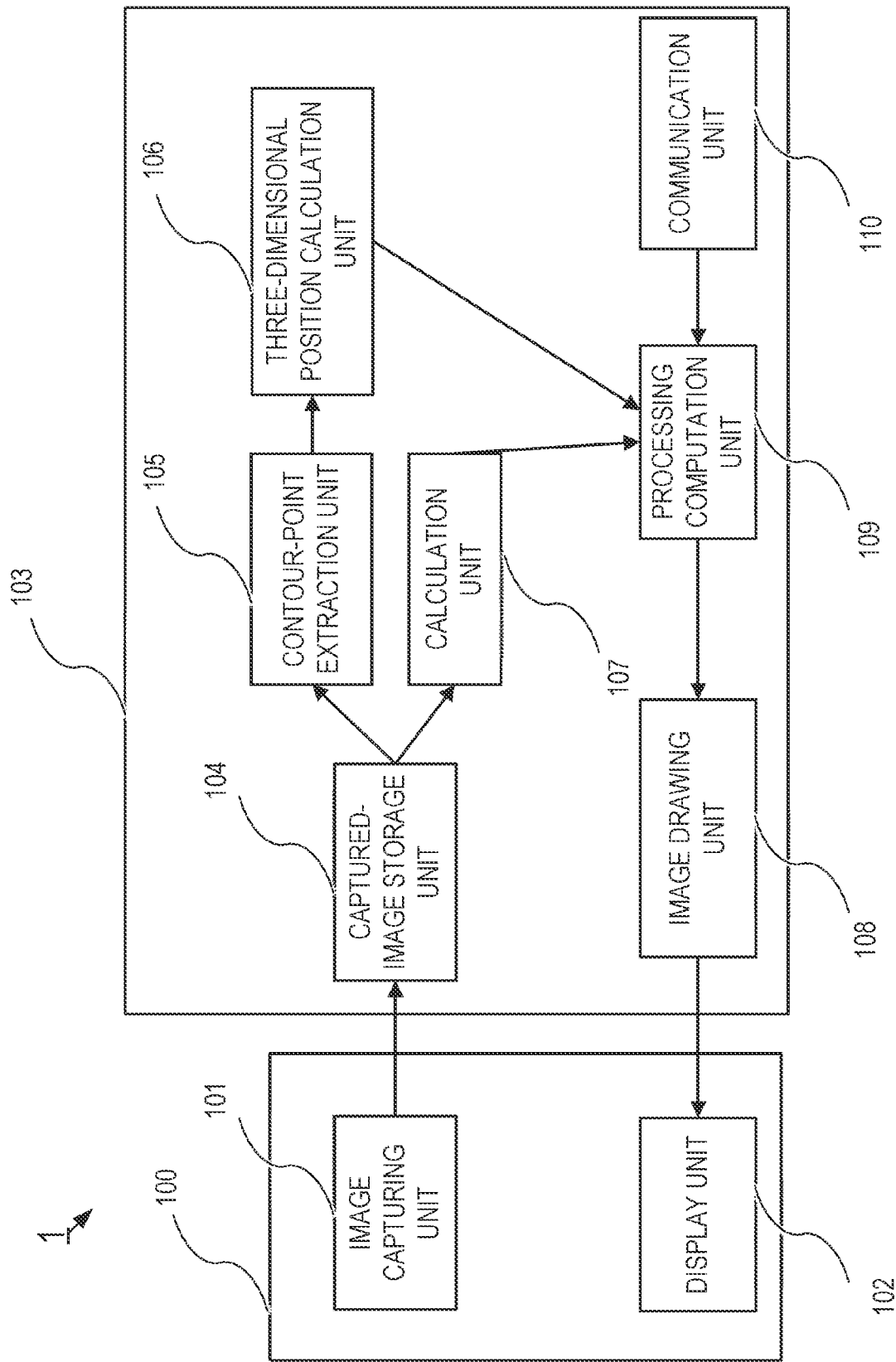
FIG. 1 is a block configuration diagram of a MR system according to a first embodiment.
Figure 2:
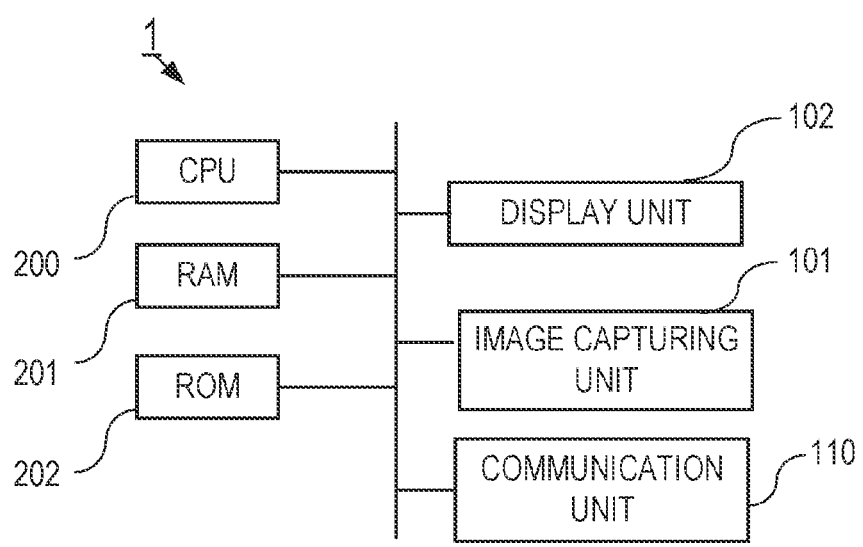
FIG. 2 is a hardware configuration diagram of the MR system according to the first embodiment.

FIG. 2 shows the hardware configurations of a mixed reality system (MR system) 1 according to a first embodiment. FIG. 1 shows the block configurations of the MR system 1.

As shown in FIG. 2, the MR system 1 has an image capturing unit 101, a display unit 102, a communication unit 110, a CPU 200, a RAM 201, and a ROM 202.

The CPU 200 is a control unit that controls the whole MR system 1. The CPU 200 controls the whole MR system 1 by performing an application used to operate the MR system 1. Specifically, the CPU 200 performs an application after developing the application (program) stored in the ROM 202 into the RAM 201. Respective units shown in FIG. 1 are realized by the CPU 200. However, one or a plurality of configurations shown in FIG. 1 may be realized by hardware independent of the CPU 200.

As shown in FIG. 1, the MR system 1 has an HMD 100 and an information processing device 103.

The HMD 100 is a display device (Head-Mounted Display) for wearing on a head. The HMD 100 is a video see-through display device. The HMD 100 has the image capturing unit 101 and the display unit 102. Information (setting information) on the settings of the HMD 100 is stored in the ROM 202.

In the HMD 100, the image capturing unit 101 is arranged in front of the eyes of a user wearing the HMD 100. The display unit 102 displays an image (captured image) acquired when the image capturing unit 101 captures an image of a surrounding area. In a video see-through HMD, the position and attitude of an image capturing unit 101 are generally handled as the position and attitude of an experiencing person. Note that the HMD 100 of the present embodiment is a video see-through HMD but is shown only as an example. For example, the present embodiment is also applicable to an HMD for virtual reality in which a captured image (image obtained by capturing an image of a real space) is not displayed on a display unit 102. In this case, an image capturing unit 101 is used as, for example, a camera used to capture an image of a hand that is a measurement target.

The image capturing unit 101 captures an image of a real space at a predetermined frame rate (for example, 30 frames/second). The image capturing unit 101 is fixed to the housing of the HMD 100. The image capturing unit 101 has two actual cameras. An actual camera for a left eye and an actual camera for a right eye are arranged at positions close to both eyes of a user. A pair of right and left images obtained by capturing images by the image capturing unit 101 may also be called "stereo camera images".

The information processing device 103 generates, on the basis of a captured image acquired by the image capturing unit 101, data to be displayed on the display unit 102. The information processing device 103 may be included in the HMD 100, or may be hardware independent of the HMD 100. The information processing device 103 has a captured-image storage unit 104, a contour-point extraction unit 105, a three-dimensional position calculation unit 106, a calculation unit 107, an image drawing unit 108, a processing computation unit 109, and a communication unit 110.

The captured-image storage unit 104 stores a captured image acquired by capturing an image by the image capturing unit 101. The captured-image storage unit 104 is realized by the RAM 201. Therefore, a captured image is stored in the RAM 201.

The contour-point extraction unit 105 extracts the contour points of a finger from a captured image according to an image recognition technology.

The three-dimensional position calculation unit 106 calculates the three-dimensional positions (x, y, and z coordinates) of the contour points of a finger extracted by the contour-point extraction unit 105. The x-coordinate and the y-coordinate are coordinates set when the lower left of the VRAM region of a captured image is assumed as an origin (0, 0). The coordinates of the origin are not limited to the lower left of the VRAM region but may be freely determined by a user. The z-coordinate is a coordinate that shows a distance from the HMD 100 and is acquirable on the basis of a captured image.

Note that in order to correctly display the depth of a hand (the value of a z-coordinate), a method in which the region of the hand is extracted from a captured image obtained by capturing an image of the hand by a stereo camera to calculate the depth value of the hand with respect to the stereo camera may be used. As such, a method in which depth values are calculated by triangulation for all the corresponding points of a captured image of an extracted contour line of a hand as shown in Japanese Patent Application Laid-open No. 2012-13514 may be used. In Japanese Patent Application Laid-open No. 2012-13514, stereo cameras mounted in a video see-through HMD (display device for presenting a mixed reality feeling) are used.

Note that Leap Motion by Leap Motion company is capable of measuring the position and attitude of a hand including the position and attitude of a finger of the hand. The Leap Motion is capable of detecting the region of a hand by using a stereo camera (image capturing unit 101). Note that a depth (distance sensor) sensor may be installed in the HMD 100 since the estimation of the position and attitude of a finger of a hand is enabled by the depth sensor.

In the present embodiment, the three-dimensional position calculation unit 106 determines any one point from contour points extracted by the contour-point extraction unit 105, and calculates the three-dimensional position of the contour point of the one determined point. Information on the position of the contour point of the one determined point is stored in the RAM 201 as information on a reference position. Further, information on a new three-dimensional position is periodically stored in the RAM 201 in accordance with the movement of a finger.

The calculation unit 107 calculates the position and attitude of a hand in a captured image stored in the captured-image storage unit 104. As a method for calculating the position and attitude of a hand, a method using deep learning or a method using an existing library open to the public may be used.

The image drawing unit 108 draws, on the basis of the processing result of the processing computation unit 109, an image to be displayed on the display unit 102 of the HMD 100.

The processing computation unit 109 compares a three-dimensional position (coordinate value) calculated by the three-dimensional position calculation unit 106 with a value (coordinate value) measured by an external sensor (such as a sensor 303 that will be described later). The value measured by the sensor is a value acquired from the controller 300 (small operation device) or the like through Bluetooth™ communication. Specifically, the processing computation unit 109 determines whether a change in the coordinates of a hand detected by the HMD 100 matches a change in the coordinates of the controller 300. The processing computation unit 109 determines that the hand detected by the HMD 100 and the hand with the controller 300 attached thereto are identical with each other (that is, the hand of the user wearing the HMD 100) when the two changes in the coordinates match each other. Note that coordinates acquired by the sensor are generally deviated from actual coordinates. Therefore, the processing computation unit 109 may determine that the two changes in the coordinates match each other when the difference between the two changes in the coordinates falls within a certain error rate (for example, within 5%). Note that the error rate may be arbitrarily determined by the user.

Here, in order to obtain a value to be compared with a three-dimensional position calculated by the three-dimensional position calculation unit 106, the processing computation unit 109 may perform computation processing on IMU information (inertial information) received from the controller 300. Meanwhile, a control unit 301 of the controller 300 may transmit "information obtained by performing computation processing on the IMU information" to the HMD 100.

The communication unit 110 has, for example, an antenna for wireless communication, a modulation/demodulation circuit (circuit for processing a wireless signal), and a communication controller. The communication unit 110 outputs a modulated wireless signal from an antenna, or demodulates a wireless signal received by the antenna. Thus, the communication unit 110 realizes short-range wireless communication in compliance with the IEEE802.15 standard (so called Bluetooth™). In the present embodiment, Bluetooth Low Energy version 5.1 having low power consumption is employed as Bluetooth communication.

Figure 5A:
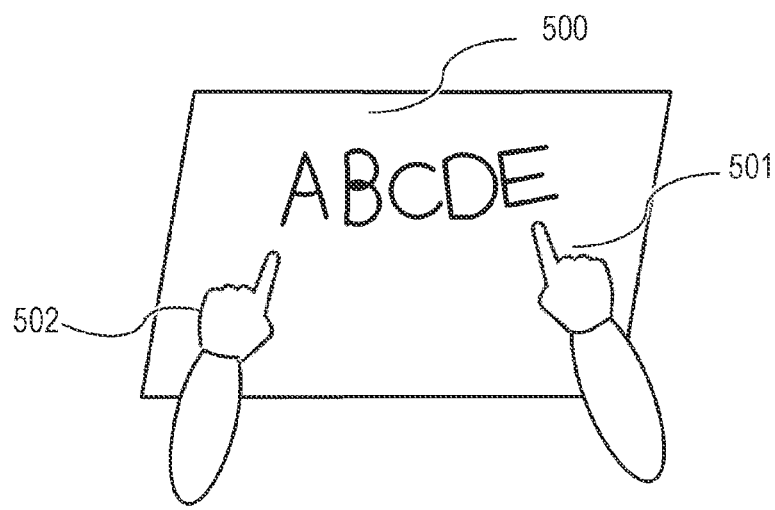
FIGS. 5A and 5B are diagrams for describing the switching of an operation mode according to the first embodiment.
Figure 5B:
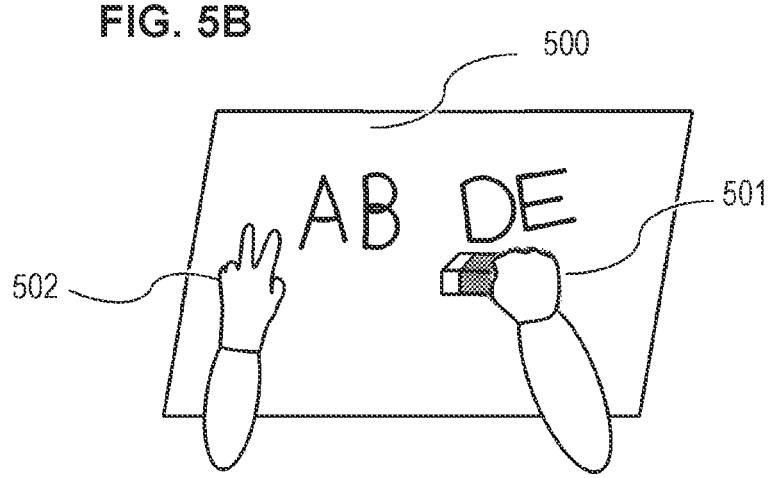

FIGS. 5A and 5B are diagrams for describing the switching of an operation mode in the first embodiment. Hereinafter, one hand for switching an operation mode by a gesture will be called a "gesture hand". Further, the other hand that does not serve as the "gesture hand" among two hands will be called a "processing hand". Further, in the first embodiment, it can be said that a gesture is "a kind of a user operation" since the operation of the HMD 100 is controlled by the gesture.

In FIG. 5A, a user draws characters by a gesture (hand gesture) using a right hand as a hand (processing hand 501) to perform drawing processing on a drawing area 500. Here, the user uses a left hand as a hand (gesture hand 502) to perform "a gesture to switch an operation mode". Thereby, the user can switch processing (execution processing) that is being performed by the processing hand 501 to another processing. In FIG. 5B, processing that is performed by the processing hand 501 is switched from a "character drawing mode" to a "character deletion mode" by a gesture by the gesture hand 502. Note that operation modes after switching (and processing executable in the operation modes) are associated with (assigned to) respective gestures in advance in order to switch an operation mode by a gesture.

Outline of Switching Processing

Hereinafter, the outline of the switching processing of an operation mode by the CPU 200 of the MR system 1 according to the first embodiment will be described with reference to the flowchart of FIG. 8.

Note that the CPU 200 is capable of detecting, as a detection unit, gestures by respective right and left hands from a captured image (image acquired by the image capturing unit 101). Then, the CPU 200 is capable of switching, as a processing unit, an operation mode as described above in accordance with a gesture by the left hand or the right hand.

In step S800, the CPU 200 determines whether a hand has been detected from a captured image (image acquired by the image capturing unit 101). The CPU 200 controls, for example, the contour-point extraction unit 105 and the three-dimensional position calculation unit 106 to determine whether the hand has been detected from the captured image. When it is determined that the hand has been detected, the processing proceeds to step S801. When it is determined that the hand has not been detected, the processing of step S800 is repeatedly performed.

In step S801, the CPU 200 determines whether the hand detected in step S800 is a gesture hand. When it is determined that the detected hand is the gesture hand, the processing proceeds to step S802. When it is determined that the detected hand is not the gesture hand, the processing returns to step S800.

For example, when an operation device or the like is attached to the detected hand, the CPU 200 determines that the detected hand is the gesture hand. Further, on the menu screen of system settings or the like, a user may set a right hand or a left hand as the gesture hand in advance. For example, when the left hand is set as the gesture hand in advance, the CPU 200 determines whether the hand detected in step S800 is the left hand.

In step S802, the CPU 200 determines whether a gesture by the hand (gesture hand) detected in step S800 has been detected. When it is determined that the gesture has been detected, the processing proceeds to step S803. When it is determined that the gesture has not been detected, the processing of step S802 is repeatedly performed.

In step S803, the CPU 200 switches to an operation mode associated with the detected gesture (operation mode in which processing associated with the gesture is performed). The CPU 200 associates gestures with operation modes in advance, and switches to an operation mode associated with a detected gesture. Note that in the first embodiment, processing performed by a gesture by a processing hand is different when an operation mode is different.

Examples of Drawing

Figure 6A:
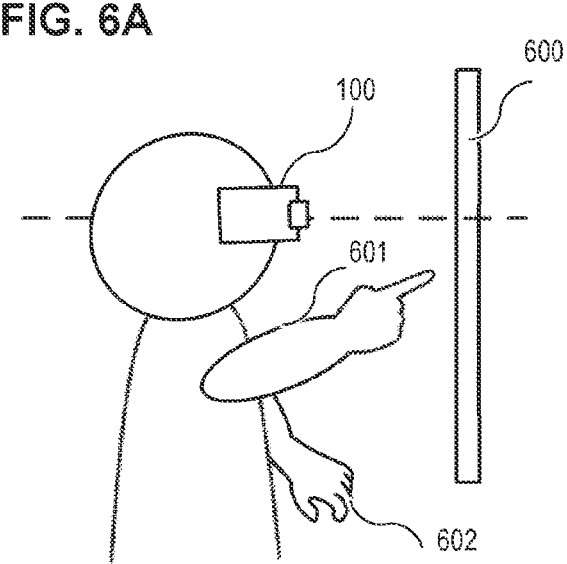
FIGS. 6A to 6C are diagrams for describing drawing processing according to the first embodiment.
Figure 6B:
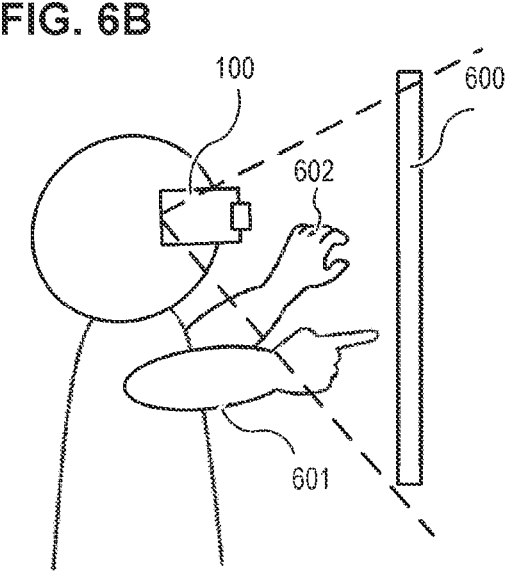
Figure 6C:
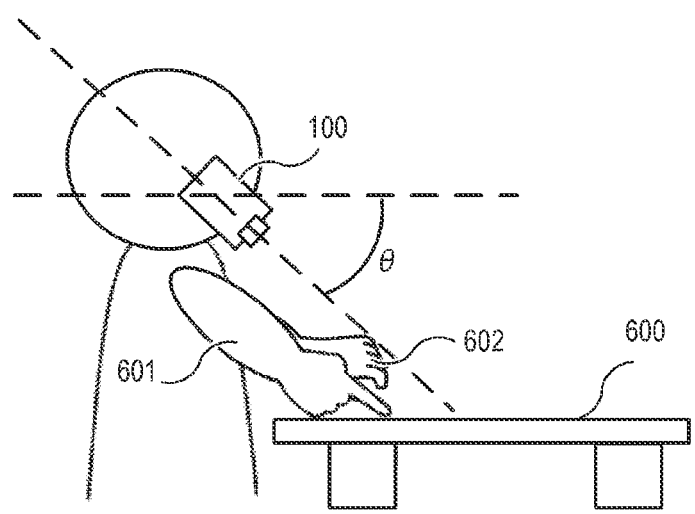

FIGS. 6A to 6C are diagrams each describing an example in which a user performs drawing using the HMD 100 according to the first embodiment.

In FIG. 6A, the user performs drawing on a drawing area 600 by a right hand 601 (processing hand) while standing up. When there is no need to switch an operation mode, a left hand 602 serving as a gesture hand may not particularly move while the right hand 601 performs the drawing. Therefore, the left hand 602 is lowered in FIG. 6A.

FIG. 6B shows a state in which the user performs "a gesture to switch an operation mode" by the left hand 602. At this time, the left hand 602 is needed to be included in the imaging range of the image capturing unit 101 of the HMD 100 in order to determine the gesture by the left hand 602. Therefore, the user raises the left hand 602 so as to be included in the imaging range of the image capturing unit 101 of the HMD 100.

Meanwhile, FIG. 6C shows a state in which the user performs drawing while sitting down after the drawing area 600 is set on the desk. When the user sits down, a state in which the left hand 602 is positioned on the drawing area 600 is likely to occur even in a case where there is no need to switch an operation mode by a gesture. Therefore, it is highly likely that the left hand 602 is included in the imaging range of the image capturing unit 101. Accordingly, when the user performs drawing on the desk while sitting down, the switching of an operation mode by a gesture is needed to be restricted.

Note that when the user performs drawing or the like while sitting down, the HMD 100 faces downward from a horizontal direction. Therefore, when the HMD 100 faces downward from the horizontal direction by a certain angle θ (by an amount larger than the certain angle θ), the HMD 100 may determine that the user performs drawing on the desk while sitting down.

Figure 7:
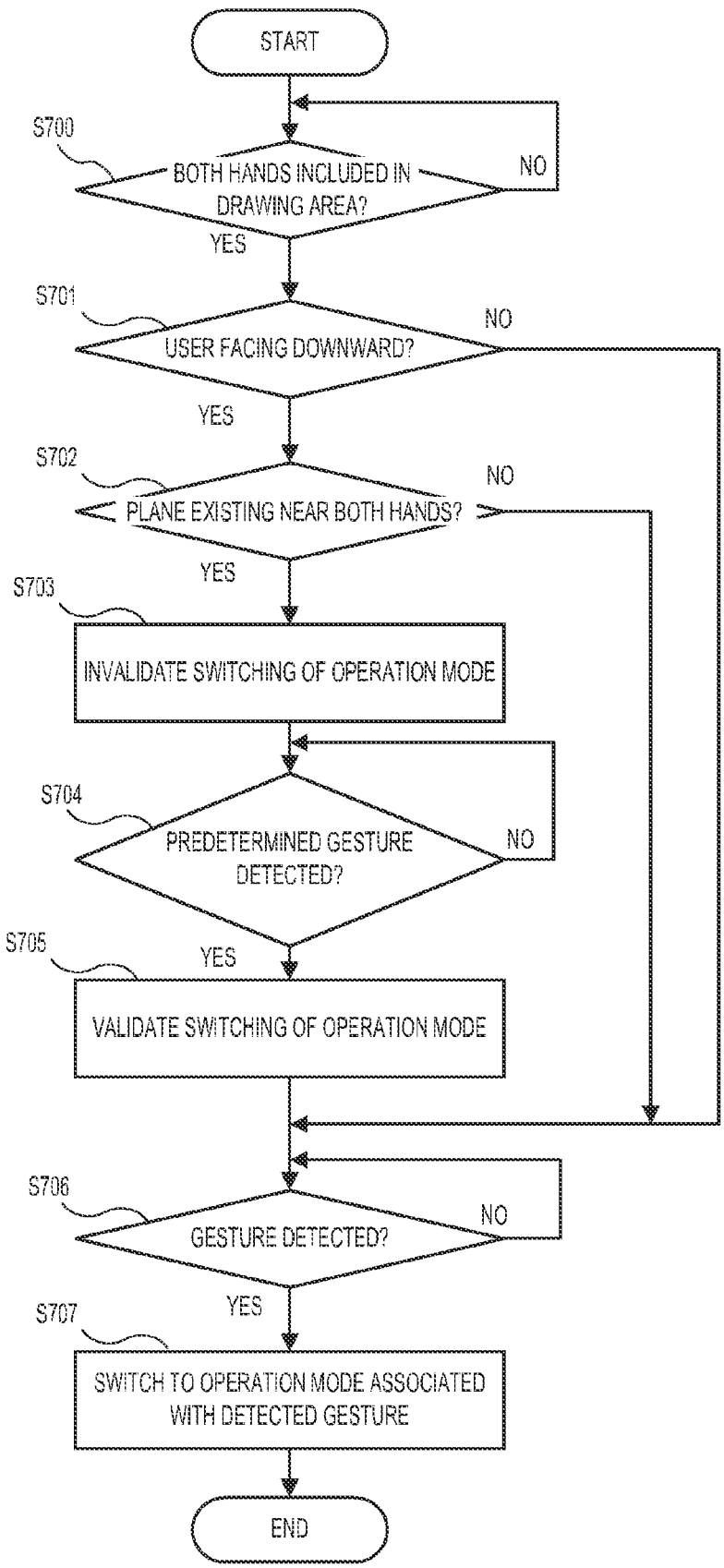
FIG. 7 is a flowchart of switching processing relating to drawing according to the first embodiment.

With reference to the flowchart of FIG. 7, switching processing performed by the CPU 200 of the MR system 1 (for example, the CPU 200 of the information processing device 103) when a user performs drawing on a drawing area will be described. That is, the flowchart of FIG. 7 is a flowchart for describing in further detail the flowchart of FIG. 8 in a case where drawing processing is performed. Note that in order to detect a gesture by the HMD 100, both hands are needed to be included in a drawing area in a real space (area in which the function of a whiteboard or the like is set).

In step S700, the CPU 200 determines, on the basis of an image obtained by capturing an image of a drawing area by the image capturing unit 101, whether both hands are positioned in the drawing area. When it is determined that both hands are not positioned in the drawing area, the processing of step S700 is repeatedly performed. When it is determined that both hands are positioned in the drawing area, the processing proceeds to step S701.

In step S701, the CPU 200 determines whether a user (HMD 100) faces downward. For example, when the HMD 100 tilts toward a negative direction (downward direction) by an amount larger than a certain angle θ (see FIG. 6C) with respect to a horizontal direction, the CPU 200 determines that the user faces downward. On the other hand, when the HMD 100 tilts by an amount smaller than the certain angle θ, the CPU 200 may determine that the user performs a drawing operation using a wall, an aerial region, or the like as a drawing area.

When it is determined that the user faces downward, the CPU 200 detects feature points from the captured image acquired by the image capturing unit 101 and detects a plane in a real space on the basis of the feature points. Then, the processing proceeds to step S702. On the other hand, when it is determined that the user does not face downward, the processing proceeds to step S706.

In step S702, the CPU 200 determines whether the distance between both hands detected in step S700 and the plane (plane detected in step S701) is shorter than a predetermined distance. When it is determined that the distance between both hands and the plane is shorter than the predetermined distance, the processing proceeds to step S703. When it is determined that the distance between both hands and the plane is at least the predetermined distance, the processing proceeds to step S706.

In step S703, the CPU 200 invalidates the switching of an operation mode by a gesture by a gesture hand. This aims to prevent, except when the user intends to switch an operation mode, the switching of the operation mode as a gesture is detected when the gesture hand is included in an imaging range.

In step S704, the CPU 200 determines whether a predetermined gesture (gesture for validating the switching of an operation mode by a gesture) has been detected. Here, the predetermined gesture is set in advance. When it is determined that the predetermined gesture has been detected, the processing proceeds to step S705. When it is determined that the predetermined gesture has not been detected, the processing of step S704 is repeatedly performed. Note that when a controller or the like is attached to a hand, a "predetermined operation with respect to the controller" may be used instead of the "predetermined gesture".

In step S705, the CPU 200 validates "the switching of an operation mode by a gesture by the gesture hand" (cancels "the invalidation of the switching of the operation mode by the gesture by the gesture hand").

In step S706, the CPU 200 determines, on the basis of a captured image, whether the gesture by the gesture hand has been detected. When it is determined that the gesture by the gesture hand has been detected, the processing proceeds to step S707. When it is determined that the gesture by the gesture hand has not been detected, the processing of step S706 is repeatedly performed.

In step S707, the CPU 200 switches to an operation mode associated with the gesture detected in step S706. Thus, the CPU 200 switches processing (execution processing) to be executed in accordance with an operation by a processing hand. Therefore, in a case where a certain gesture has been performed by the gesture hand, first processing is executed when a certain operation is performed by the processing hand. On the other hand, in a case where another gesture has been performed by the gesture hand, second processing different from the first processing is executed when the same certain operation is performed by the processing hand.

Here, operation efficiency is poor if the execution, switching, and the like of processing is performed only by the processing hand in a case where it is desired that the processing performed by a processing hand (hand by which the processing is executed) be frequently switched. On the other hand, operation efficiency (operability) is improved in the present embodiment since the switching of an operation mode is realized by a gesture by another hand not serving as a processing hand.

Second Embodiment

A second embodiment will describe a method for setting a processing hand and a gesture hand in advance using a controller 300 that is retained by or attached to a hand of a user.

Figure 3:
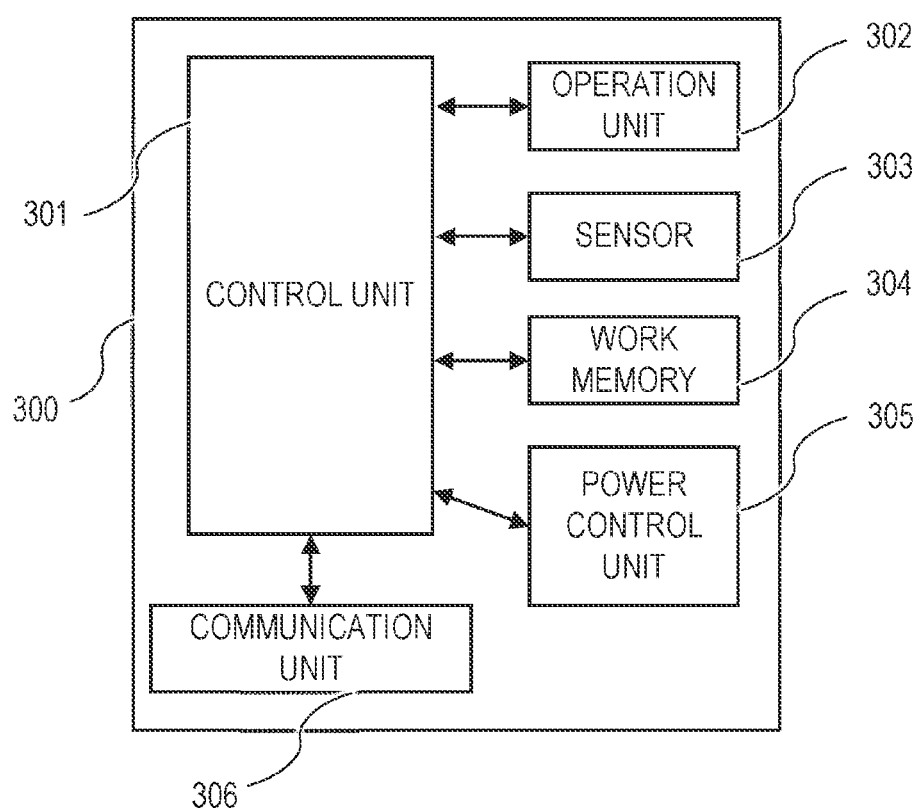
FIG. 3 is a block configuration diagram of a controller according to a second embodiment.

FIG. 3 shows the block configurations of the controller 300. The controller 300 is an operation device formed in such a shape as to be attachable to a finger of a hand. However, the controller 300 is not necessarily formed in such a shape as to be attachable to a finger but may be formed in any shape retainable by a user with a hand. The controller 300 has a control unit 301, an operation unit 302, a sensor 303, a work memory 304, a power control unit 305, and a communication unit 306.

The control unit 301 controls the controller 300 (whole device) in accordance with an input signal or program. Note that instead of the control of the whole device by the control unit 301, a plurality of hardware may share processing with each other to control the whole device.

The operation unit 302 receives instructions to the controller 300 from a user. The operation unit 302 includes, for example, a power button (button for providing instructions by the user to turn ON/OFF main power besides supplying power to the control unit 301 of the controller 300) and a mode switching button (button for switching an operation mode), or the like. In addition, the operation unit 302 includes a button for starting communication with external equipment such as an HMD 100 via the communication unit 306.

The sensor 303 is, for example, a sensor for acquiring information (hereinafter called "sensor information") such as inertial measurement unit (IMU) information. The sensor 303 is capable of calculating, on the basis of an angular speed (value detected by a gyro sensor) and acceleration (value detected by an accelerometer), a change in attitude, the direction (relative direction), and the position of the controller 300.

The work memory 304 is used as a buffer memory (memory that temporarily stores sensor information acquired by the sensor 303), the work region of the control unit 301, or the like.

The power control unit 305 supplies power for operating the controller 300.

The communication unit 306 has, for example, an antenna for wireless communication, a modulation/demodulation circuit for processing a wireless signal, and a communication controller like the communication unit 110 of the HMD 100. The communication unit 306 realizes short-range wireless communication in compliance with the IEEE802.15 standard.

Figure 4:
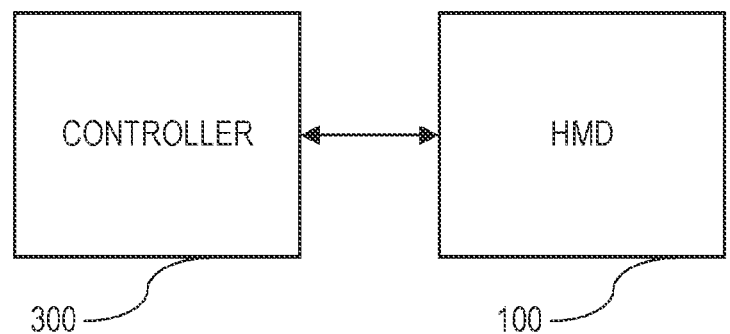
FIG. 4 is a diagram for describing the connection between an HMD and a controller according to the second embodiment.

FIG. 4 shows the connection configuration of the HMD 100 and the controller 300. The HMD 100 and the controller 300 are connected to each other through Bluetooth communication.

For example, sensor information acquired by the sensor 303 is transmitted to the communication unit 110 of the HMD 100 via the communication unit 306 of the controller 300. In the data communication between the HMD 100 and the controller 300, not only Bluetooth communication but also other communication methods may be used.

Note that the movement of a hand to which the controller 300 is attached is distinguishable from the movement (sensor information) of the controller 300. Therefore, a hand to which the controller 300 is attached may not be necessarily included in the imaging range of an image capturing unit 101.

Here, sensor information acquired by the sensor 303 is transmitted to the communication unit 110 of the HMD 100 via the communication unit 306. Then, the HMD 100 is enabled to detect the movement of the controller 300 on the basis of the sensor information of the sensor 303. Therefore, the HMD 100 is capable of more accurately acquiring the movement of a hand using the sensor information of the sensor 303, other than using a method in which the movement of the hand is acquired on the basis of a captured image. Further, the HMD 100 is capable of acquiring the movement of a hand on the basis of both a captured image and sensor information. Accordingly, when the controller 300 is attached, a hand to which the controller 300 is attached is used as a processing hand to enable the fine control of processing.

Figure 9:
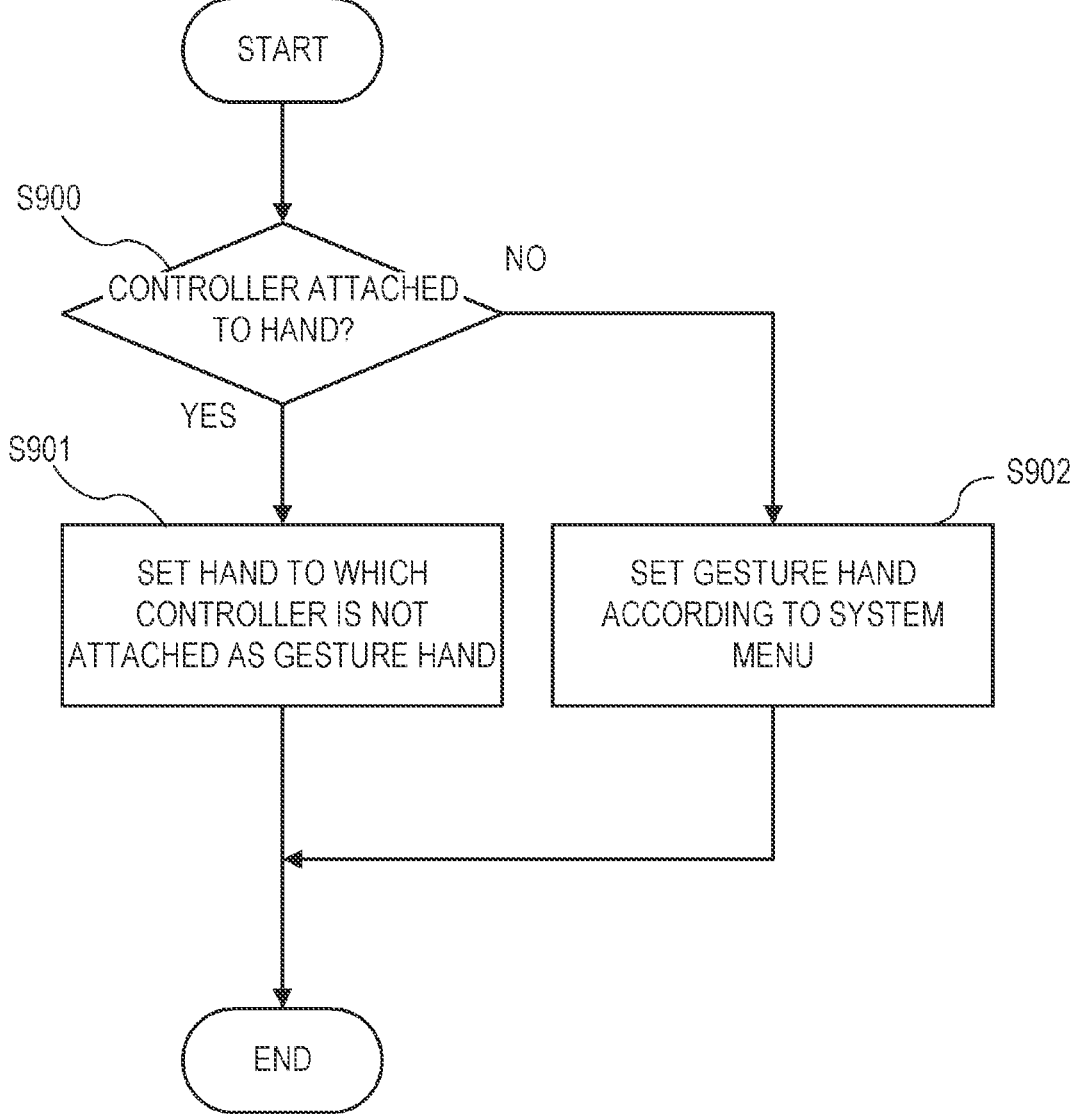
FIG. 9 is a flowchart of the processing of a MR system according to the second embodiment.

With reference to the flowchart of FIG. 9, processing by a CPU 200 of a MR system 1 according to the second embodiment will be described. Hereinafter, with reference to FIG. 9, processing to set a gesture hand (hand for performing a gesture) and a processing hand (hand for performing processing) will be described.

In step S900, the CPU 200 determines whether the controller 300 is attached to a hand of a user. When it is determined that the controller 300 is attached to the hand of the user, the processing proceeds to step S901. When it is determined that the controller 300 is not attached to the hand of the user, the processing proceeds to step S902.

Here, when both hands are reflected in an image (imaging range) obtained when the image capturing unit 101 captures an image of the imaging range, the CPU 200 is capable of determining whether the controller 300 is attached to the hand from the captured image. On the other hand, when only one hand is reflected in the captured image, the CPU 200 determines whether the controller 300 is attached to the reflected hand from the captured image. Further, in a case where the HMD 100 has performed communication with the controller 300, the CPU 200 may determine that the controller 300 is attached to the hand of the user even if at least one hand is not reflected in the captured image.

In step S901, the CPU 200 sets a hand to which the controller 300 is not attached as a gesture hand. Further, the CPU 200 sets the hand to which the controller 300 is attached as a processing hand.

In step S902, the CPU 200 sets one of right and left hands as a gesture hand and the other thereof as a processing hand in accordance with a user operation in a system menu. That is, in a case where the controller 300 is not attached, the CPU 200 sets one of the right and left hands as a gesture hand according to the same method as that of the first embodiment.

In the second embodiment, a hand to which the controller 300 is attached is handled as a processing hand. Thus, the user is capable of performing processing with a hand of which the movement is easily detected with accuracy. Therefore, processing intended by the user is easily realized.

Figure 8:
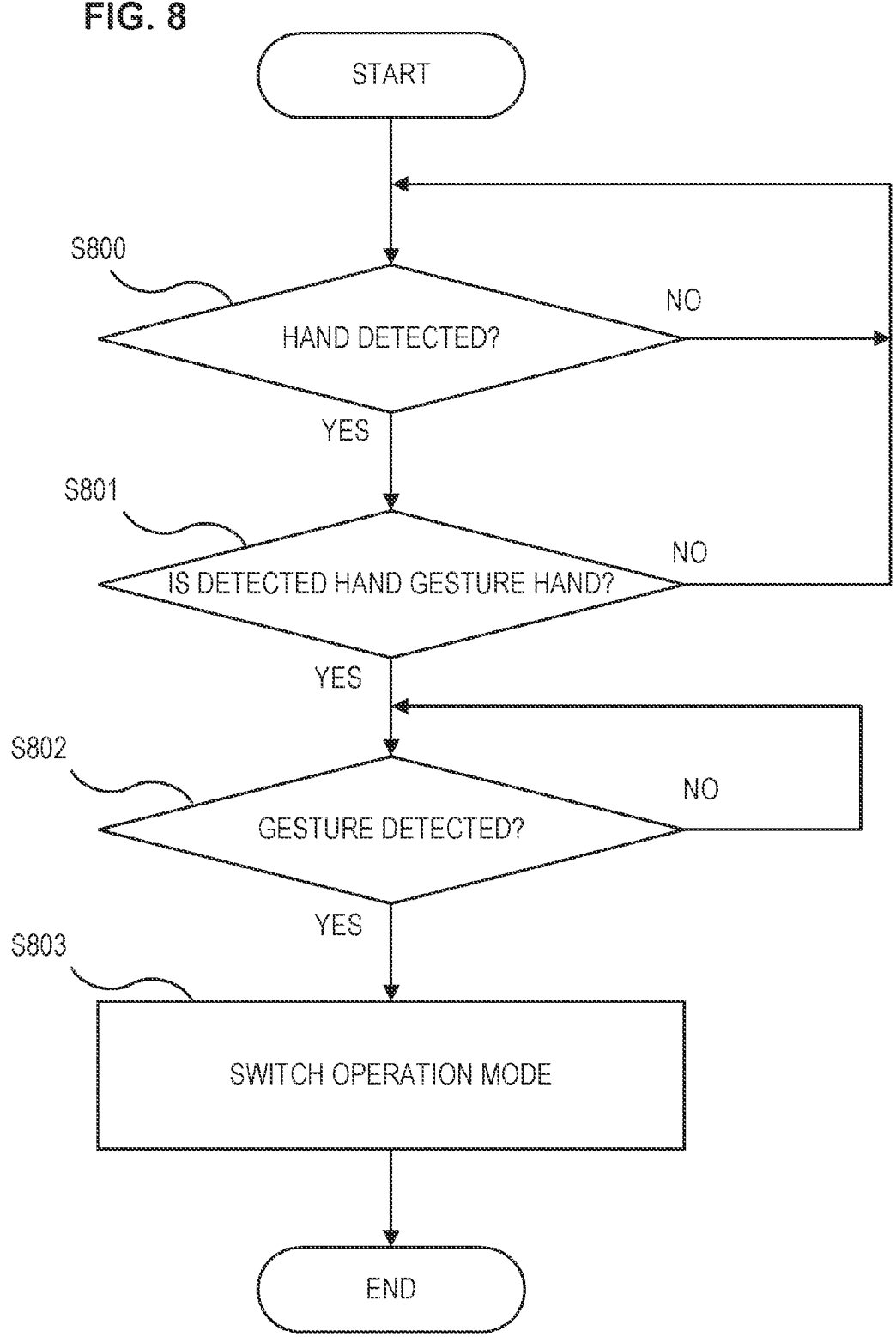
FIG. 8 is a flowchart of the outline of switching processing according to the first embodiment.

Note that the processing of the flowchart shown in FIG. 7 or 8 in the first embodiment is performed after a processing hand and a gesture hand are set. Further, in a case where the controller 300 needed to be gripped by a hand is used, the user has a difficulty in performing fine processing with the hand holding the controller 300. In this case, the CPU 200 may therefore set a hand not holding the controller 300 as a processing hand and a hand holding the controller 300 as a gesture hand.

Third Embodiment

A third embodiment will describe a MR system 1 that performs the input of characters in accordance with the movement of hands.

Figure 10:
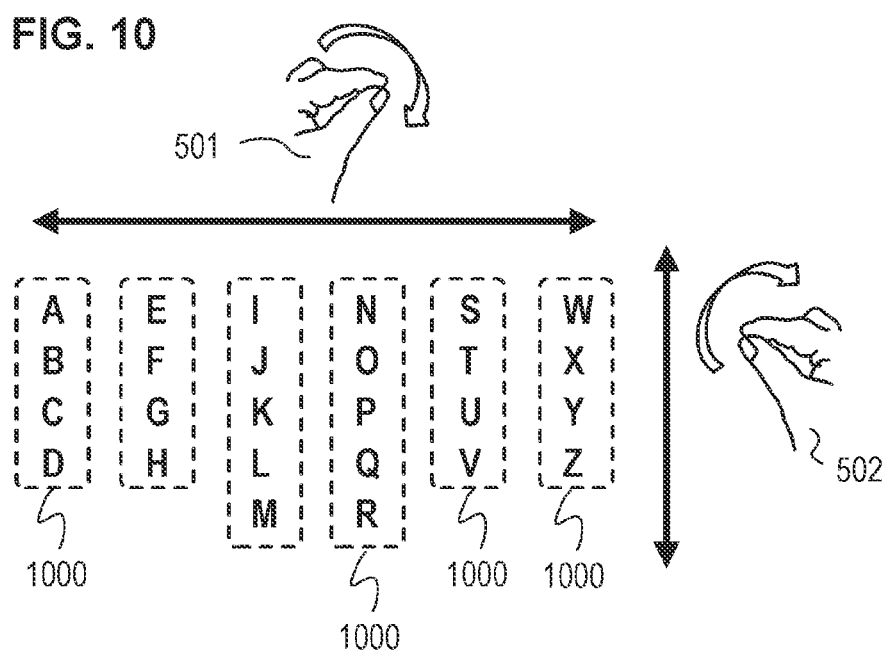
FIG. 10 is a diagram showing the relationship between hands and character groups according to a third embodiment.

FIG. 10 is a schematic diagram showing the relationship between hands and character groups. In the third embodiment, a user selects one of character groups 1000 each including a plurality of characters using a processing hand 501. Then, the user selects one character from among the characters of the selected character group 1000 using a gesture hand 502. Thus, the input of the character selected by the user is performed. Note that the plurality of characters included in each of the character groups 1000 are set in advance.

For example, in FIG. 10, each of the plurality of character groups 1000 includes a plurality of alphabets.

Here, when a calculation unit 107 detects a first gesture by the processing hand 501 and also detects the rotation of the processing hand 501, a CPU 200 switches a selected character group 1000. Note that the rotation of a hand is also a kind of a gesture by the hand.

Then, when the calculation unit 107 detects a second gesture by the gesture hand 502, the CPU 200 selects a character from among the characters of the selected character group 1000. Further, the CPU 200 switches the selected character after detecting the rotation of the gesture hand 502. For example, when the calculation unit 107 detects a gesture other than the second gesture by the gesture hand 502, the CPU 200 performs the input (fixation) of a character. The first gesture and the second gesture are needed to be set in advance. Hereinafter, a description will be given assuming that both a first gesture and a second gesture are gestures for performing pinching with fingers (see FIG. 10). However, the first gesture and the second gesture may be gestures different from each other.

With reference to the flowchart of FIG. 15, processing performed by the CPU 200 of the MR system 1 according to the third embodiment will be described.

In step S1500, the CPU 200 determines whether the processing hand 501 has performed a first gesture. When it is determined that the processing hand 501 has performed the first gesture, the processing proceeds to step S1501. When it is determined that the processing hand 501 has not performed the first gesture, the processing of step S1500 is repeatedly performed.

In step S1501, the CPU 200 switches an operation mode to a "character-group selection mode". When the operation mode is switched to the "character-group selection mode", the CPU 200 displays a character input region 1100 on a display unit 102 so as to overlap a real space as shown in (1) of FIG. 11. Note that the character input region 1100 is displayed at, for example, a position higher by a predetermined distance than a higher one of the position of the processing hand 501 and the position of the gesture hand 502. Further, the CPU 200 selects one character group 1000 (for example, the first character group 1000) set in advance.

Figure 11:
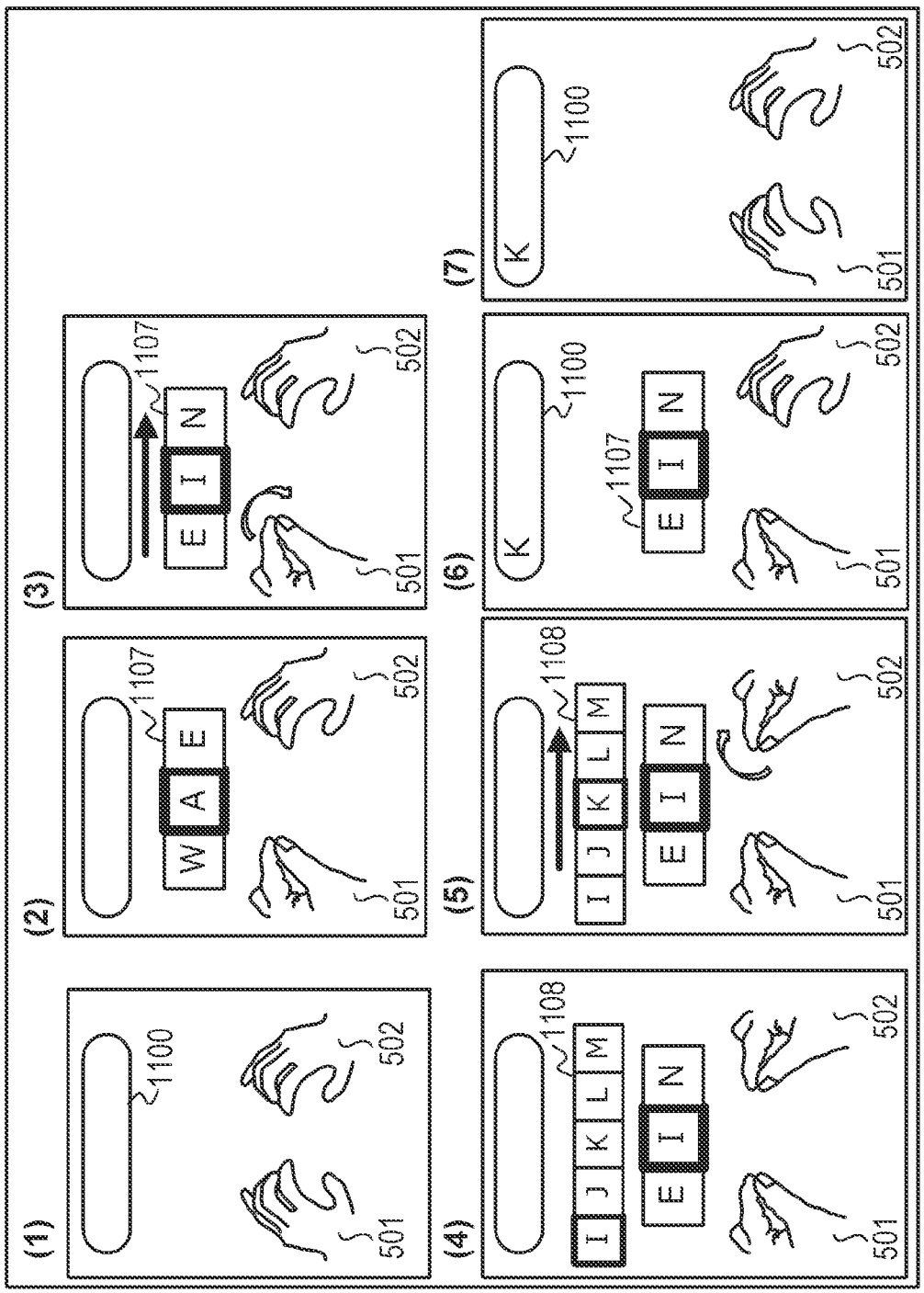
FIG. 11 is a diagram for describing the input of characters according to the third embodiment.

In step S1502, the CPU 200 displays a group selection screen 1107 on the display unit 102 as shown in (2) of FIG. 11. The group selection screen 1107 is a screen in which a character group 1000 is selected. As shown in FIG. 11, the selected character group 1000 or a character is surrounded by a thick frame.

In step S1503, the CPU 200 determines whether the processing hand 501 (the wrist of the processing hand 501) has rotated by at least a predetermined angle (threshold) (for example, whether the processing hand 501 has been formed in a predetermined shape). When it is determined that the processing hand 501 has rotated by at least the predetermined angle, the processing proceeds to step S1504. When it is determined that the processing hand 501 has not rotated by at least the predetermined angle, the processing proceeds to step S1505.

In step S1504, the CPU 200 switches the selected character group 1000 in accordance with the rotating direction of the processing hand 501 (the wrist of the processing hand 501) as shown in (3) of FIG. 11. For example, when the processing hand 501 has rotated clockwise, the CPU 200 selects a character group 1000 just on the right side of the currently-selected character group 1000 in the group selection screen 1107.

In step S1505, the CPU 200 determines whether the gesture hand 502 has performed a second gesture. When it is determined that the gesture hand 502 has performed the second gesture, the processing proceeds to step S1506. When it is determined that the gesture hand 502 has not performed the second gesture, the processing proceeds to step S1503.

In step S1506, the CPU 200 switches the operation mode to a "character selection mode" in which one character is selected from among the characters of the selected character group 1000. At this time, the CPU 200 selects, for example, the first character from among the characters of the selected character group 1000.

In step S1507, the CPU 200 displays a character selection screen 1108 (screen in which the plurality of characters included in the selected character group 1000 are arranged in a line) on a display unit 102 as shown in (4) of FIG. 11.

In step S1508, the CPU 200 determines whether the gesture hand 502 (the wrist of the gesture hand 502) has rotated by at least a predetermined angle (for example, whether the gesture hand 502 has been formed in a predetermined shape). When it is determined that the gesture hand 502 has rotated by at least the predetermined angle, the processing proceeds to step S1509. When it is determined that the gesture hand 502 has not rotated by at least the predetermined angle, the processing proceeds to step S1510.

In step S1509, the CPU 200 switches the selected character in accordance with the rotating direction of the gesture hand 502 as shown in (5) of FIG. 11. For example, when the hand has rotated clockwise, the CPU 200 selects a character just on the right side of the currently-selected character on the character selection screen 1108.

In step S1510, the CPU 200 determines whether the gesture hand 502 has performed a second operation (specific operation other than the second gesture). When it is determined that the gesture hand 502 has performed the second operation, the processing proceeds to step S1511. When it is determined that the gesture hand 502 has not performed the second operation, the processing proceeds to step S1508. Here, the second operation may be a gesture by the gesture hand 502 or an operation on a controller or the like attached to the gesture hand 502.

In step S1511, the CPU 200 inputs the currently-selected character to the character input region 1100. That is, the CPU 200 fixes the selection of the currently-selected character.

In step S1512, the CPU 200 switches from the "character selection mode" to the "character-group selection mode".

In step S1513, the CPU 200 ends the display of the character selection screen 1108 (hides the character selection screen 1108) as shown in (6) of FIG. 11.

In step S1514, the CPU 200 determines whether the processing hand 501 has performed a first operation (operation other than the first gesture). When it is determined that the processing hand 501 has performed the first operation, the processing proceeds to step S1515. When it is determined that the processing hand 501 has not performed the first operation, the processing proceeds to step S1501. Here, the first operation may be a gesture by the processing hand 501 or an operation on a controller or the like attached to the processing hand 501.

In step S1515, the CPU 200 ends the "character-group selection mode".

In step S1516, the CPU 200 ends the display of the group selection screen 1107 as shown in (7) of FIG. 11.

In the example shown in FIG. 11, the group selection screen 1107 is displayed (step S1502) as shown in (2) of FIG. 11 when the processing hand 501 has performed the first gesture (YES in step S1500). Next, the selected character group 1000 is switched (step S1504) as shown in (3) of FIG. 11 in accordance with the rotation of the processing hand 501 (YES in step S1503). The character selection screen 1108 is displayed (step S1507) as shown in (4) of FIG. 11 when the gesture hand 502 has performed the second gesture (YES in step S1505).

Then, the character selected in the character selection screen 1108 is switched (step S1509) as shown in (5) of FIG. 11 in accordance with the rotation of the gesture hand 502 (YES in S1508). The selected character is input to the character input region 1100 (step S1511) as shown in (6) of FIG. 11 when the gesture hand 502 has performed the second operation (YES in step S1510). Then, the group selection screen 1107 is hidden (step S1516) as shown in (7) of FIG. 11 when the processing hand 501 has performed the first operation (YES in step S1514).

According to the third embodiment, a user is capable of performing the input of characters without contacting an operation member such as a keyboard and a touch panel. Therefore, the user is enabled to sanitarily perform the input of characters. Furthermore, since roles are assigned to respective right and left hands, the user is enabled to realize the input of characters without performing complicated gestures or the like by one hand.

Fourth Embodiment

A fourth embodiment will describe a MR system 1 that enables switching to a sub-group associated with a character group 1000. Here, the sub-group is a group including characters associated with respective characters included in the character group 1000. For example, when a character group 1000 includes a plurality of hiragana characters in Japanese, a sub-group includes the voiced sound characters of the plurality of hiragana characters.

Figure 12:
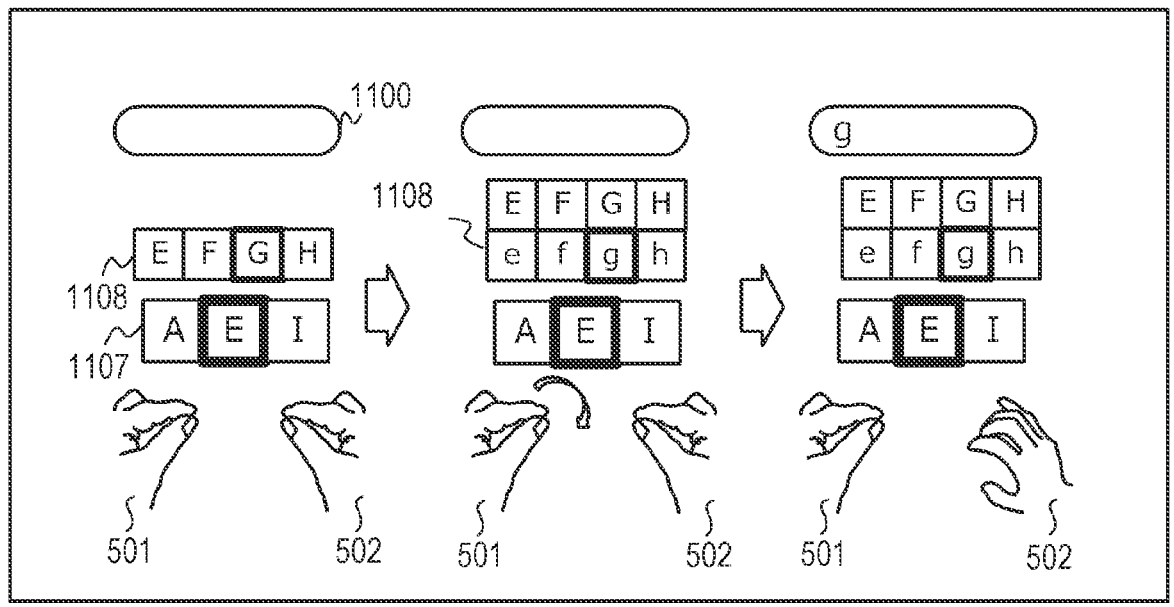
FIG. 12 is a diagram for describing the input of characters according to a fourth embodiment.

FIG. 12 is a diagram for describing processing according to the fourth embodiment. For example, in a case where a character is selected from among the characters of a character group 1000, the selected character group 1000 is switched to a sub-group associated with the character group 1000 when the rotation of a processing hand 501 is detected. For example, FIG. 12 shows a state in which a character group 1000 showing "E, F, G, H" is switched to a sub-group showing "e, f, g, h" as the rotation of the processing hand 501 is detected.

Figure 15:
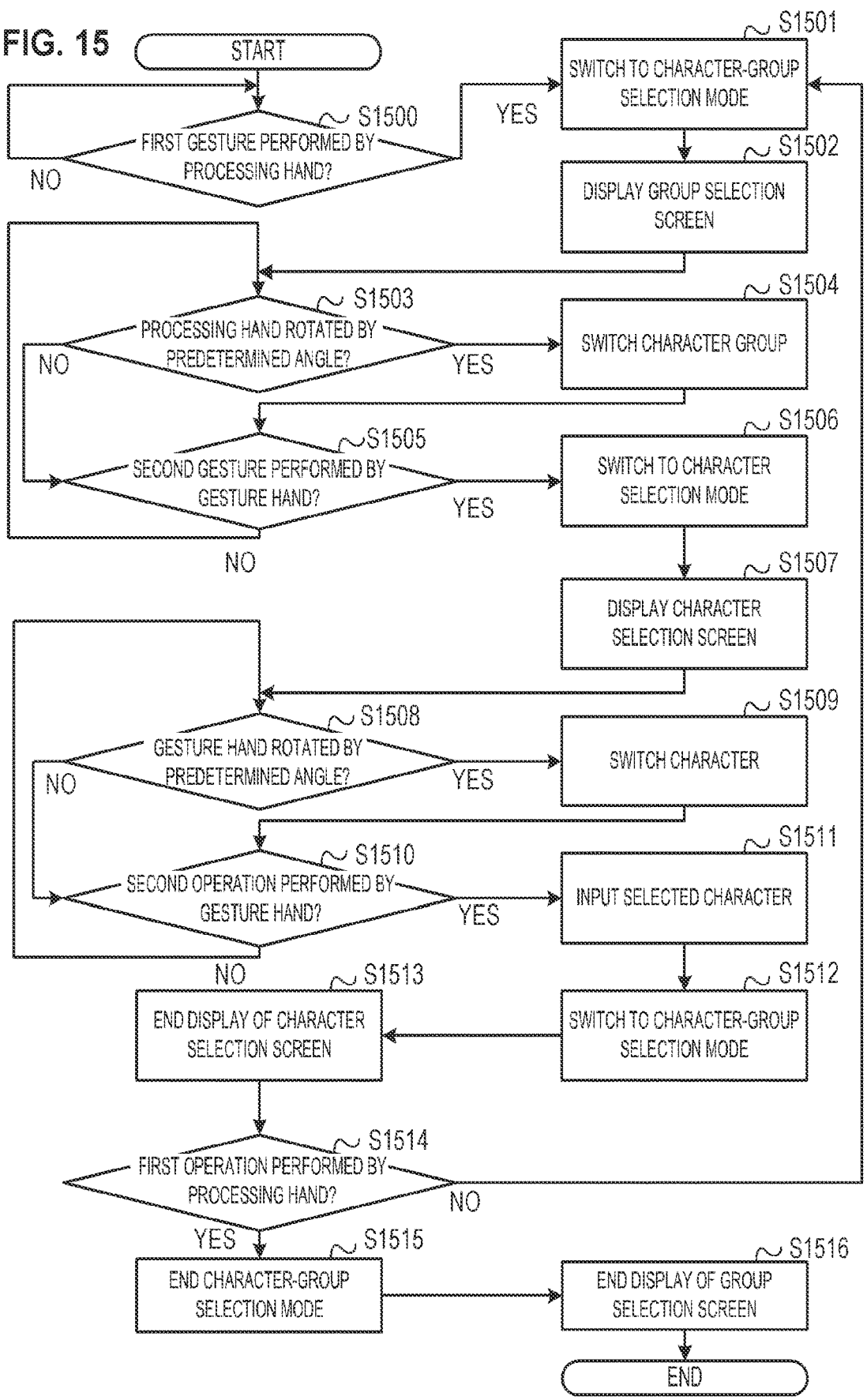
FIG. 15 is a flowchart of the processing of a MR system according to the third embodiment.
Figure 16:
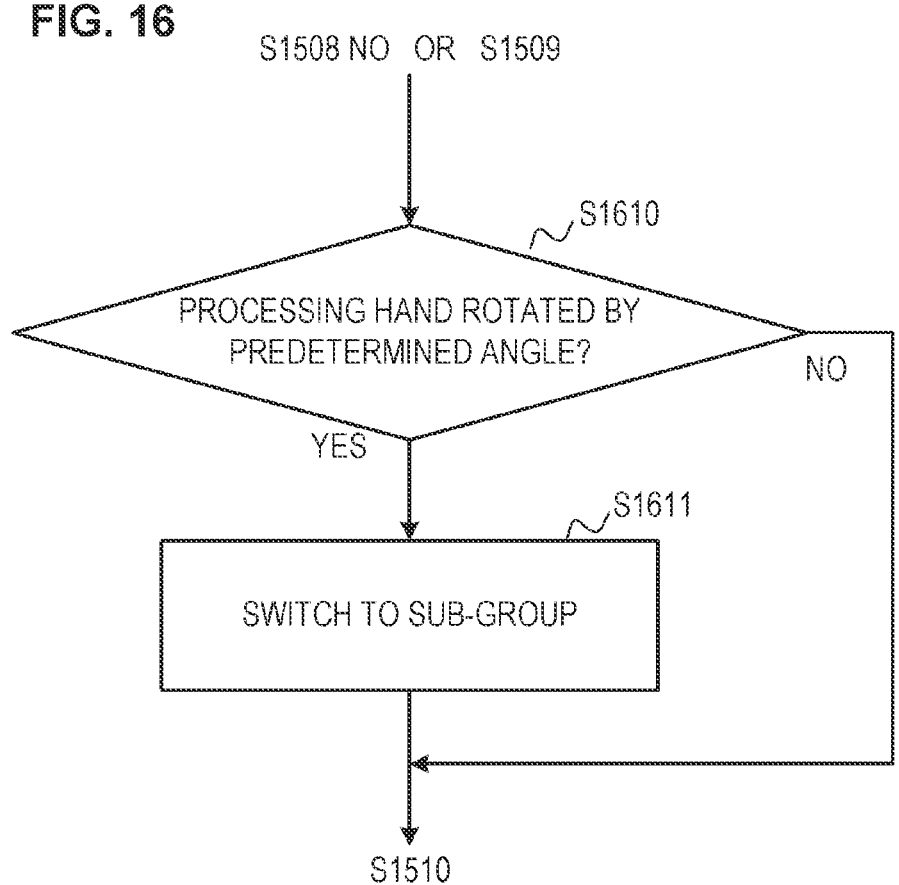
FIG. 16 is a flowchart of the processing of a MR system according to the fourth embodiment.

The fourth embodiment (the flowchart of FIG. 16) is different from the flowchart of FIG. 15 in that the processing of steps S1610 and S1611 is added to the processing of the flowchart of FIG. 15 according to the third embodiment. Therefore, only the processing of steps S1610 and S1611 will be described. The processing of step S1610 starts when it is determined in step S1508 that a gesture hand 502 has not rotated by at least a predetermined angle or when the processing of step S1509 ends.

In step S1610, the CPU 200 determines whether the processing hand 501 has rotated by at least a predetermined angle. When it is determined that the processing hand 501 has rotated by at least the predetermined angle, the processing proceeds to step S1611. When it is determined that the processing hand 501 has not rotated by at least the predetermined angle, the processing proceeds to step S1510.

In step S1611, the CPU 200 switches a selected character group 1000 to a sub-group associated with the character group 1000 in a character selection screen 1108. Then, the CPU 200 selects a character from among the characters of the sub-group corresponding to a character currently selected in the character group 1000.

According to the fourth embodiment, it is possible to intuitively perform the input of special characters such as voiced sound characters in Japanese or small letters or symbols in English.

Fifth Embodiment

In a fifth embodiment, a MR system 1 also performs the deletion of characters.

Figure 13:
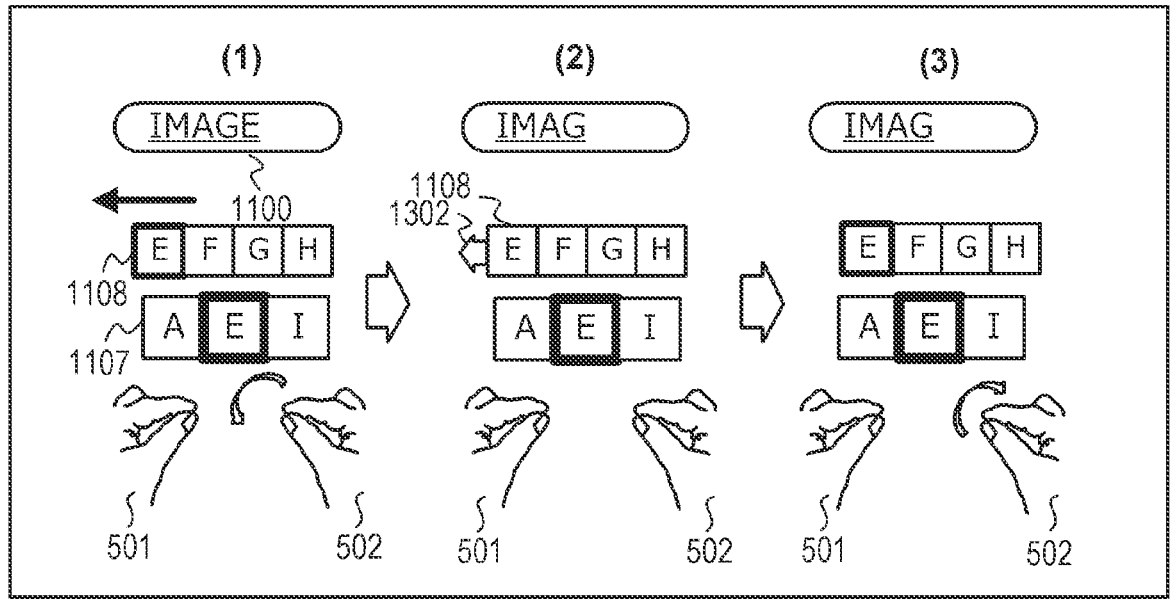
FIG. 13 is a diagram for describing the deletion of characters according to a fifth embodiment.

FIG. 13 is a diagram for describing the deletion of a character in the fifth embodiment. When the selection of a character is performed from among the characters of a character group 1000, the character is deleted as the rotation of a gesture hand 502 is detected in a direction in which no characters exist as viewed from the currently-selected character. During the deletion of the character, a character deletion item 1302 is displayed, and the character continues to be deleted. The deletion of the character ends as the rotation of the gesture hand 502 is detected in a direction in which characters exist as viewed from the character deletion item 1302. Note that the deletion of a character may be performed when "any gesture by the gesture hand 502 to indicate a direction in which no characters exist as viewed from the currently-selected character among directions in which characters are arranged side by side in a character selection screen 1108" is detected. For example, the deletion of a character may be performed when a gesture by the gesture hand 502 to indicate a left direction with an index finger is detected in a state in which no characters exist in the left direction of the currently-selected character.

FIG. 13 shows a state in which a character "E" is deleted from characters "IMAGE" input to a character input region 1100 as the counterclockwise rotation of the gesture hand 502 is detected (a gesture indicating a left direction has been performed).

Figure 17:
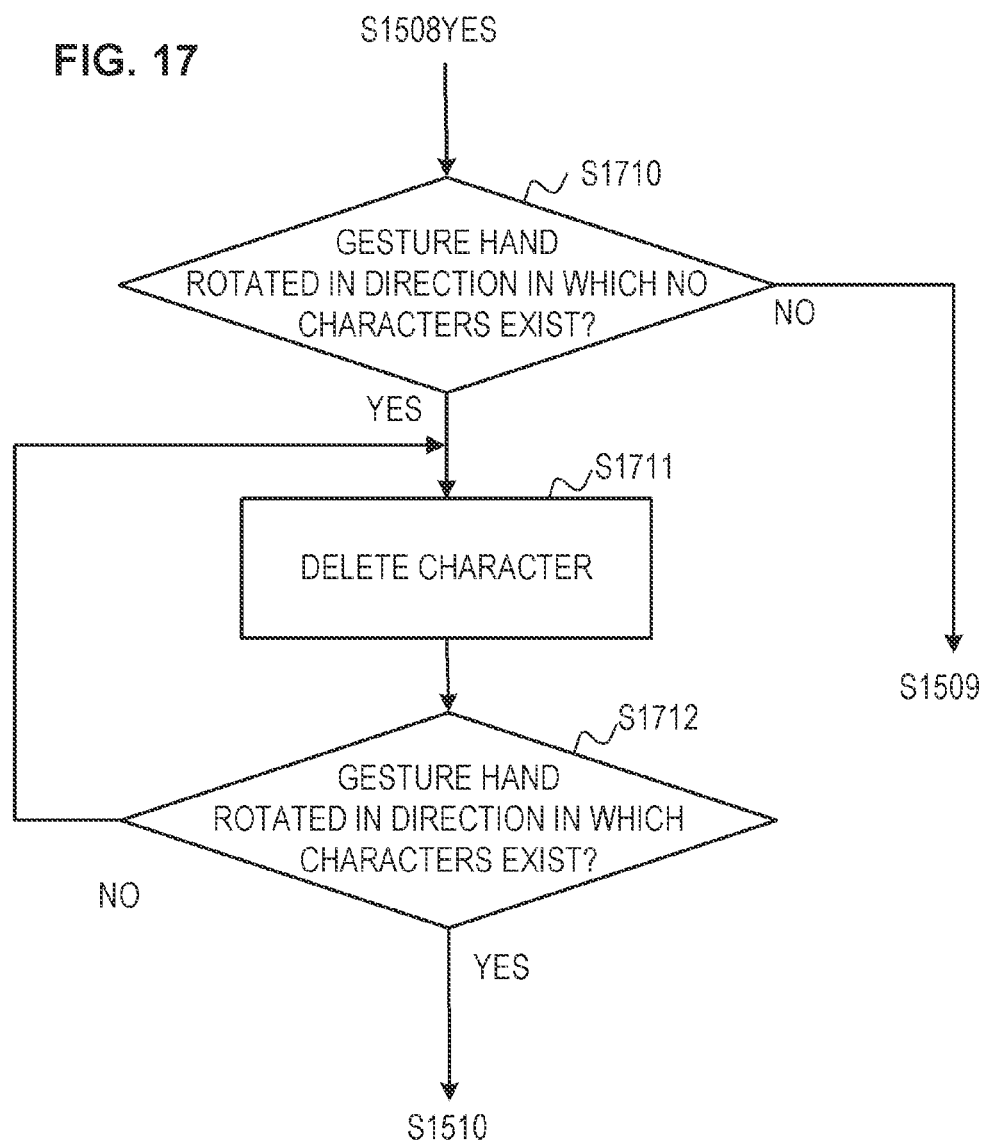
FIG. 17 is a flowchart of the processing of a MR system according to the fifth embodiment.

With reference to the flowchart of FIG. 17, processing performed by a CPU 200 of the MR system 1 according to the fifth embodiment will be described. In the processing according to the fifth embodiment, the processing of steps S1710 to S1712 as shown in the flowchart of FIG. 17 is added to the processing of the flowchart of FIG. 15. Therefore, only the processing of steps S1710 to S1712 will be described hereinafter.

The processing of step S1710 starts when it is determined in step S1508 that a gesture hand 502 has rotated by at least a predetermined angle.

In step S1710, the CPU 200 determines whether characters exist in the rotating direction of the gesture hand 502 as viewed from a character selected in a character selection screen 1108. When it is determined that no characters exist in the rotating direction of the hand as viewed from the selected character, the processing proceeds to step S1711. When it is determined that the characters exist in the rotating direction of the hand as viewed from the selected character, the processing proceeds to step S1509.

In step S1711, the CPU 200 performs the deletion of the last character input to the character input region 1100. Further, the CPU 200 displays a character deletion item 1302.

In step S1712, the CPU 200 determines whether characters exist in the rotating direction of the gesture hand 502 as viewed from the character deletion item 1302 when newly detecting the rotation of the gesture hand 502 by at least a predetermined angle. When it is determined that the characters exist in the rotating direction of the gesture hand 502, the processing proceeds to step S1510. Otherwise, the processing proceeds to step S1711.

For example, a state shown in (2) of FIG. 13 changes to a state shown in (3) of FIG. 13 as the gesture hand 502 is rotated by at least a predetermined angle in a direction (clockwise direction) in which characters exist during the deletion of a character in the character input region 1100, and the deletion of the character ends.

According to the fifth embodiment, a user is enabled to perform not only the input of characters but also the deletion of characters by gestures by right and left hands.

Sixth Embodiment

In a sixth embodiment, an MR system 1 detects the shapes and rotation of both hands of a user, and converts character strings (characters) input to a character input region 1100.

Figure 14:
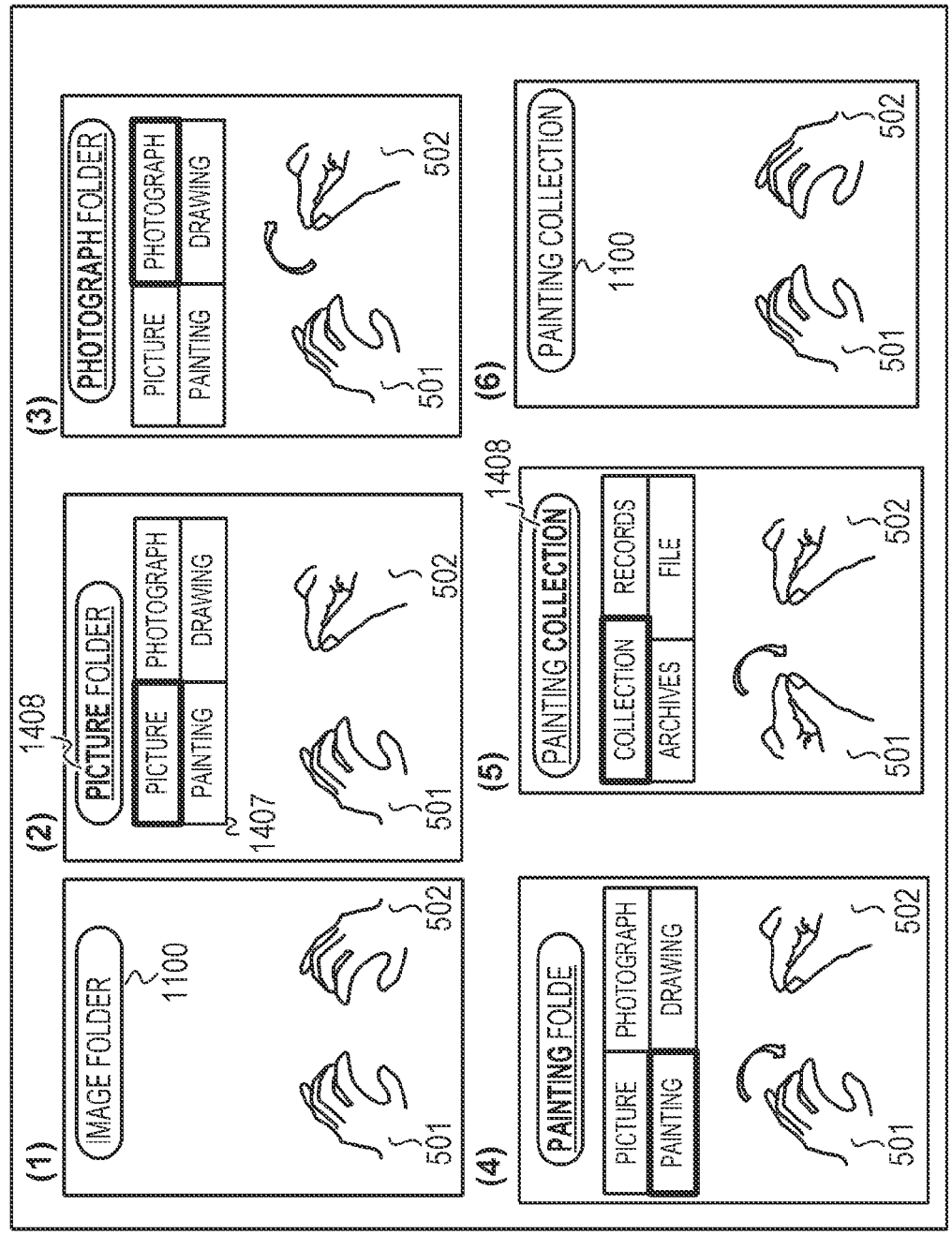
FIG. 14 is a diagram for describing the conversion of character strings according to a sixth embodiment.

FIG. 14 is a diagram for describing the conversion of character strings in the sixth embodiment. FIG. 14 is a diagram showing an example of converting English words into the synonymous words of the English words.

The MR system 1 selects a conversion candidate 1407 for a character string (character string after conversion) after detecting a second gesture by a gesture hand 502. The MR system 1 changes the character string to be converted when detecting a first gesture by a processing hand 501, and ends character conversion when detecting a second operation by the gesture hand 502.

Figure 18:
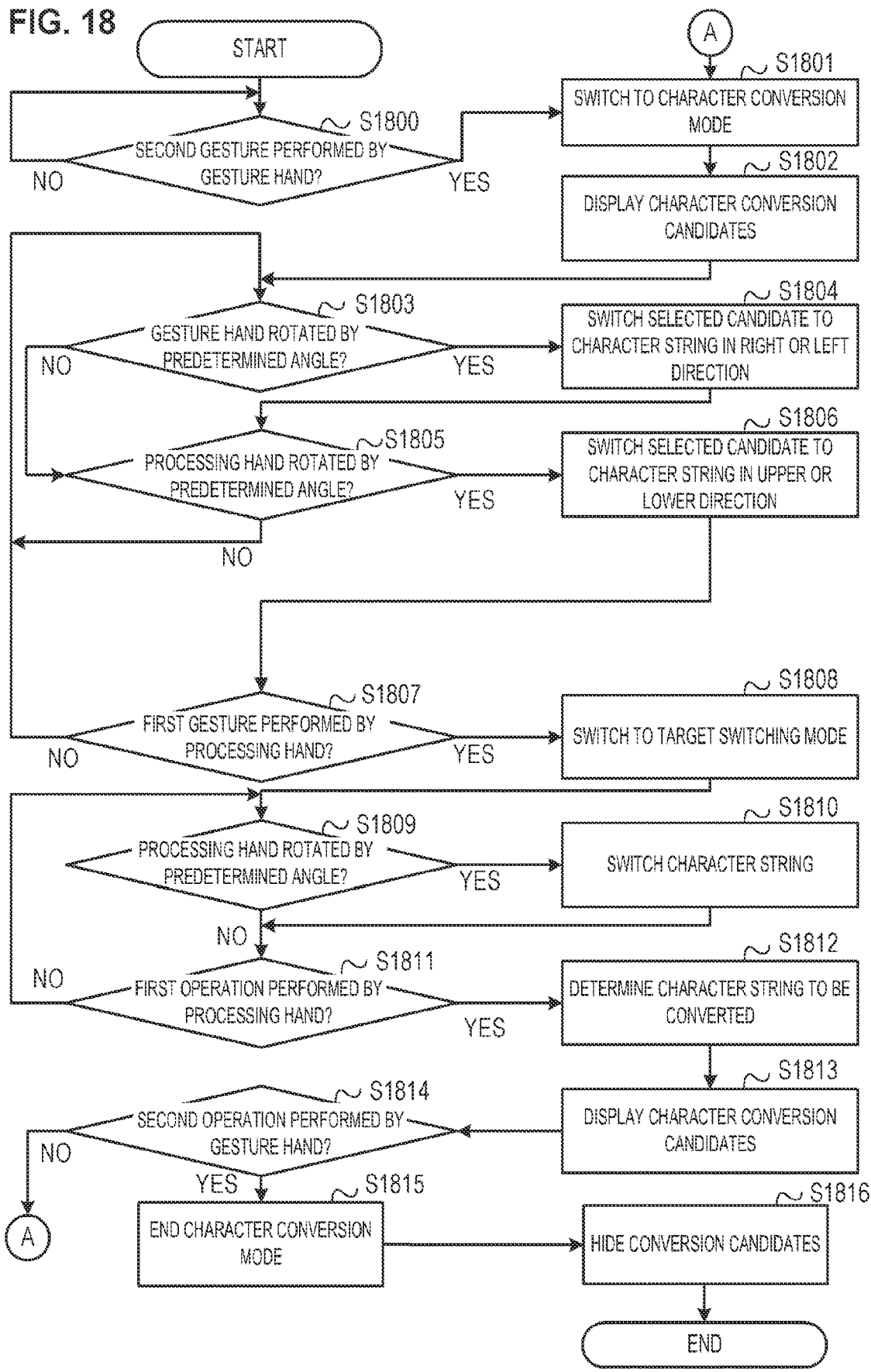
FIG. 18 is a flowchart of the processing of a MR system according to a sixth embodiment.

With reference to the flowchart of FIG. 18, processing by a CPU 200 of the MR system 1 according to the sixth embodiment will be described.

In step S1800, the CPU 200 determines whether the gesture hand 502 has performed a second gesture. When it is determined that the second gesture has been performed, the processing proceeds to step S1801. When it is determined that the second gesture has not been performed, the processing of step S1800 is repeatedly performed.

In step S1801, the CPU 200 switches an operation mode to a "character conversion mode" in which a character string is converted.

In step S1802, the CPU 200 displays (selects) the first (beginning) character string in a character input region 1100 as a character string 1408 to be converted. At this time, the CPU 200 displays a plurality of conversion candidates 1407 for the character string 1408 to be converted as shown in (2) of FIG. 14. Further, the CPU 200 selects, for example, a conversion candidate 1407 on the most upper-left side.

In step S1803, the CPU 200 determines whether the gesture hand 502 has rotated by at least a predetermined angle. When it is determined that the gesture hand 502 has rotated by at least the predetermined angle, the processing proceeds to step S1804. When it is determined that the gesture hand 502 has not rotated by at least the predetermined angle, the processing proceeds to step S1805.

In step S1804, the CPU 200 switches the selected conversion candidate 1407 to a character string existing in a direction corresponding to a rotating direction of the gesture hand 502 among right and left directions. For example, (3) of FIG. 14 shows a state in which "PICTURE" selected as the conversion candidate 1407 for a character string "IMAGE" is switched to "PHOTOGRAPH" as the gesture hand 502 is rotated clockwise.

In step S1805, the CPU 200 determines whether the processing hand 501 has rotated by at least a predetermined angle. When it is determined that the processing hand 501 has rotated by at least the predetermined angle, the processing proceeds to step S1806. When it is determined that the processing hand 501 has not rotated by at least the predetermined angle, the processing proceeds to step S1803.

In step S1806, the CPU 200 switches the selected conversion candidate 1407 to a character string existing in a direction corresponding to a rotating direction among upper and lower directions as shown in (4) of FIG. 14.

In step S1807, the CPU 200 determines whether the processing hand 501 has performed a first gesture. When it is determined that the first gesture has been performed, the processing proceeds to step S1808. When it is determined that the first gesture has not been performed, the processing proceeds to step S1803.

In step S1808, the CPU 200 switches the operation mode to a "target switching mode" in which the character string 1408 to be converted is switched.

In step S1809, the CPU 200 determines whether the processing hand 501 has rotated by at least a predetermined angle. When it is determined that the processing hand 501 has rotated by at least the predetermined angle, the processing proceeds to step S1810. When it is determined that the processing hand 501 has not rotated by at least the predetermined angle, the processing proceeds to step S1811. Note that the rotation of the gesture hand 502 may be determined instead of the rotation of the processing hand 501.

In step S1810, the CPU 200 switches the character string 1408 to be converted in accordance with a rotating direction of the processing hand 501 as shown in (5) of FIG. 14.

In step S1811, the CPU 200 determines whether the processing hand 501 has performed a first operation (operation other than the first gesture). When it is determined that the first operation has been performed, the processing proceeds to step S1812. When it is determined that the first operation has not been performed, the processing proceeds to step S1809.

In step S1812, the CPU 200 determines that the conversion of a currently-selected character string 1408 is to be performed (the currently-selected character string 1408 is regarded as a conversion target). The CPU 200 switches the operation mode to the "character conversion mode".

In step S1813, the CPU 200 displays a plurality of conversion candidates 1407 for the character string 1408 determined in step S1812.

In step S1814, the CPU 200 determines whether the gesture hand 502 has performed a second operation (operation other than a specific gesture). When it is determined that the second operation has been performed, the processing proceeds to step S1815. When it is determined that the second operation has not been performed, the processing proceeds to step S1801.

In step S1815, the CPU 200 ends the "character conversion mode".

In step S1816, the CPU 200 ends the display of conversion candidates 1407 for a character string as shown in (6) of FIG. 14.

According to the sixth embodiment, it is possible to convert characters input in the third embodiment by the same operation as in the input of the characters without performing special operations.

"Alternatives" such as "marks" and "illustrations" may be used instead of "characters" described in the third to fifth embodiments. Further, groups including a plurality of alternatives may be used instead of "character groups".

Note that the processing of the flowcharts of the respective embodiments is performed by the CPU 200 of the MR system 1 as described above but the CPU 200 may be included in the HMD 100 or the information processing device 103. Further, the information processing device 103 may include the HMD 100. Further, the processing performed by the gestures by the processing hands may be performed by operations (such as pressing or sliding) on a specific operation member by the processing hands.

In addition, some of the gestures by the gesture hands may be performed by the processing hands in the respective embodiments. Some of the gestures by the processing hands may be performed by the gesture hands. That is, in some of the steps of the respective flowcharts, the "gesture hands" may be replaced by the "processing hands", or the "processing hands" may be replaced by the "gesture hands".

Using a gesture by one hand detected from an image captured by the image capturing unit 101 of the HMD 100, a function associated with the other hand (processing performed by the operation of the other hand) may be switched as described in the above respective embodiments.

According to the present invention, high operability is attainable for a user when gestures are used in operations.

Further, in the above descriptions, "processing proceeds to step S1 when A is at least B, and proceeds to step S2 when A is smaller (lower) than B" may be read as "processing proceeds to step S1 when A is larger (higher) than B, and proceeds to step S2 when A is not more than B". Conversely, "processing proceeds to step S1 when A is larger (higher)

than B, and proceeds to step S2 when A is not more than B" may be read as "processing proceeds to step S1 when A is at least B, and proceeds to step S2 when A is smaller (lower) than B". Therefore, the expression "at least A" may be replaced with "equal to A or larger (higher, longer, or greater) than A", or may be read as or replaced with "larger (higher, longer, or greater) than A" so long as no contradiction arises. Meanwhile, the expression "not more than A" may be replaced with "equal to A or smaller (lower, shorter, or less) than A", or may be replaced with or read as "smaller (lower, shorter, or less) than A". Further, "larger (higher, longer, or greater) than A" may be read as "at least A", and "smaller (lower, shorter, or less) than A" may be read as "not more than A".

The present invention is described in detail above on the basis of its preferred embodiments but is not limited to these specific embodiments. The present invention also includes various modes without departing from its gist. Some of the embodiments described above may be appropriately combined together.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-161612, filed on Oct. 6, 2022, which is hereby incorporated by reference herein in its entirety.

What is claimed is:

1. An information processing device that generates data used for a display on a head-mounted display, the information processing device comprising at least one memory and at least one processor that function as:

a detection unit configured to detect a gesture by a first hand of a user and a gesture by a second hand of the user; and a processing unit configured to switch, in a case where a specific gesture by the first hand is detected by the detection unit in a first operation mode in which first processing is executed in response to a first operation by the second hand, to a second operation mode in which second processing different from the first processing is executed in response to the first operation by the second hand, and switch, in a case where a specific gesture by the second hand is detected by the detection unit in the second operation mode, to the first operation mode, wherein the first operation mode is an operation mode in which one of a plurality of groups each including a plurality of alternatives is selected, the second operation mode is an operation mode in which one alternative is selected from among a plurality of alternatives of the selected group, and the processing unit switches, in the first operation mode, a selected group as the first hand or the second hand rotates by an amount larger than a threshold, and switches, in the second operation mode, a selected alternative as the first hand or the second hand rotates by an amount larger than the threshold.

2. The information processing device according to claim 1, wherein the at least one memory and the at least one processor further function as a control unit configured to control the head-mounted display so that a specific region in which an alternative is to be input is displayed overlapping a real space including the first hand and the second hand, and the processing unit inputs a currently-selected alternative to the specific region in accordance with a second operation in a case where one alternative is selected in the second operation mode.

3. The information processing device according to claim 2, wherein the control unit controls the head-mounted display so that the specific region is displayed at a position higher by a predetermined distance than a higher one of a position of the first hand and a position of the second hand.

4. The information processing device according to claim 2, wherein the control unit controls, in the second operation mode, the head-mounted display so that a plurality of alternatives included in a selected group are displayed to be arranged side by side, the processing unit deletes, in the second operation mode, at least one input alternative from the specific region in a case where the gesture by the first hand or the second hand to indicate a first direction is detected, and the first direction is a direction in which no alternatives exist as viewed from the selected alternative among directions in which the plurality of alternatives are arranged side by side.

5. The information processing device according to claim 1, wherein at least any of the plurality of groups is each associated with a sub-group including a plurality of alternatives, and the processing unit switches, in a case where one alternative is selected from among a plurality of alternatives of a first group associated with a first sub-group, the first group to the first sub-group in accordance with the gesture by the first hand or the second hand.

6. The information processing device according to claim 1, wherein
the first operation mode is an operation mode in which a character string is converted, and
the second operation mode is an operation mode in which a character string to be converted is switched.

7. The information processing device according to claim 6, wherein
the processing unit switches, in the first operation mode, a character string after conversion in accordance with at least any of the gesture by the first hand and the gesture by the second hand detected by the detection unit.

8. An information processing method for generating data used for a display on a head-mounted display, the information processing method comprising:
detecting a gesture by a first hand of a user and a gesture by a second hand of the user;
switching, in a case where a specific gesture by the first hand is detected in detecting in a first operation mode in which first processing is executed in response to a first operation by the second hand, to a second operation mode in which second processing different from the first processing is executed in response to the first operation by the second hand; and
switching, in a case where a specific gesture by the second hand is detected in detecting in the second operation mode, to the first operation mode, wherein
the first operation mode is an operation mode in which one of a plurality of groups each including a plurality of alternatives is selected,
the second operation mode is an operation mode in which one alternative is selected from among a plurality of alternatives of the selected group,
in the first operation mode, a selected group is switched as the first hand or the second hand rotates by an amount larger than a threshold, and
in the second operation mode, a selected alternative is switched as the first hand or the second hand rotates by an amount larger than the threshold.

9. A non-transitory computer readable medium that stores a program, wherein the program causes a computer to execute an information processing method for generating data used for a display on a head-mounted display, the information processing method comprising:
detecting a gesture by a first hand of a user and a gesture by a second hand of the user; and
switching, in a case where a specific gesture by the first hand is detected in detecting in a first operation mode in which first processing is executed in response to a first operation by the second hand, to a second operation mode in which second processing different from the first processing is executed in response to the first operation by the second hand; and
switching, in a case where a specific gesture by the second hand is detected in detecting in the second operation mode, to the first operation mode, wherein
the first operation mode is an operation mode in which one of a plurality of groups each including a plurality of alternatives is selected,
the second operation mode is an operation mode in which one alternative is selected from among a plurality of alternatives of the selected group,
in the first operation mode, a selected group is switched as the first hand or the second hand rotates by an amount larger than a threshold, and
in the second operation mode, a selected alternative is switched as the first hand or the second hand rotates by an amount larger than the threshold.

* * * * *